March 24, 1970 M. E. OLSEN 3,501,849

METHOD AND DEVICE FOR TEACHING TYPING AND LANGUAGE SKILLS

Filed Nov. 17, 1966 2 Sheets-Sheet 1

INVENTOR.
MILDRED E. OLSEN

March 24, 1970  M. E. OLSEN  3,501,849
METHOD AND DEVICE FOR TEACHING TYPING AND LANGUAGE SKILLS
Filed Nov. 17, 1966  2 Sheets-Sheet 2

INVENTOR.
MILDRED E. OLSEN
BY

United States Patent Office
3,501,849
Patented Mar. 24, 1970

3,501,849
METHOD AND DEVICE FOR TEACHING TYPING AND LANGUAGE SKILLS
Mildred E. Olsen, 92 Pearl St.,
Staten Island, N.Y. 10304
Filed Nov. 17, 1966, Ser. No. 595,096
Int. Cl. G09b *13/00*
U.S. Cl. 35—6                                                4 Claims

ABSTRACT OF THE DISCLOSURE

An educational device for teaching language skills to students using the keyboard of typewriters wherein a plurality of groups of colored discs are attached to the keys of each sector of the typewriter and corresponding colored rings are engaged to each index finger of the student operating in that keyboard sector. In combination, the educational device also includes an instruction booklet having the colored discs reproduced in selective arrangement on the pages of the booklet with directional arrows for indicating the movement of the index fingers so that the student can learn langauge skills by color recognition.

---

This invention relates to educational methods and devices, and in particular to a method and a device for teaching language skills, typing and the like.

With the present emphasis on quality education for the young, and with the particular emphasis on teaching language skills to socially and economically underprivileged children, there has arisen a need for new and improved methods for teaching such skills. Furthermore, it has also become significant that an ability in typing, and the ability to operate other key board instruments such as computer input devices, teletypes and similar apparatus, can become significant as a potential vocational and professional skill for many in our increasingly automated society. Therefore, it will become apparent that an educational method and device for simultaneously promoting language skills as well as an ability to operate key board devices, would be a significant contribution.

It is well known that present methods of teaching typing and related skills necessitate that the student be adequately trained in language development, particularly in the recognition of words and sentences.

Certain of these methods include the placing of markings on the student's hands or fingers, to indicate which keys are to be operated by the individual finger. Other known methods include the application of certain markings on the typewriter keys in assisting the student to learn the location of symbols on the typewriter key board. However, in all of the known methods, the student is assumed to have a working ability to handle language and thus, the student who has been culturally deprived in the development of his language skills will have difficulty in learning how to type.

Thus, in one aspect of the present invention, a method and device is provided which trains a student to learn the positions of letters and other symbols on a key board, and thus to learn touch typing without the student's necessarily having previously developed his language skills. Furthermore, in a second aspect of this invention, the use of typing instruction can at the same time promote the learning of language skills such as word formation and the the ability to read, in that the student can teach himself to recognize words and their meanings without a prior knowledge of reading skills. This latter instruction can be performed by a student without the need of verbal instruction even though the student has little or no verbal skills. Thus, it is a general object of the present invention to provide an improved method and device for teaching typing and related skills to students.

It is a further object of this invention to provide an educational method and device which increases the student's interest and motivation to learn typing skills while concurrently developing his ability at learning language skills.

A more specific object of the present invention is to provide a method and device for teaching the location of letters and other symbols on the key board of a typewriter and related instruments using a key board, by the use of colored indicia.

It is still a further object of the present invention to provide a simple, and inexpensive method in combining the teaching of typing and language skills in a classroom environment which requires a minimum amount of teaching personnel and instruction.

With the aforesaid objects in mind, the present invention, in one perferred embodiment thereof, involves the placing of colored, opaque discs which cover the keys on a typewriter key board. The key board is divided into a plurality of sectors each of which has discs of a predetermined color placed thereon. That is, all the discs covering the keys in a given sector are of the same color, while the colors of the discs in each sector are different. A color marker is placed on each of the student's fingers, the colors of which correspond to the colors of an individual sectors on the key board in which the finger is to move during the typing exercises. Therefore, by the simple expedient of providing a color indication and a direction indication, the student can be instructed as to which finger he is to move and where this finger is to move so as to strike the appropriate key. The color and direction instructions can be given from a chart, or from an instruction manual or by simple oral instructions given by the teacher. In a significant aspect of this invention, a picture of an article which is readily recognizable by the student, such as an article of clothing or an animal, can be shown and a color and direction indication would be provided beneath the picture. The student merely follows the instructions given by the color and direction indication, and then strikes the key indicated by these instructions to type the word which describes the object shown in the picture. In this manner, the student can essentially teach himself new words in an interesting and rapid manner to quickly increase his knowledge in reading and vocabulary. It will be appreciated that this method may be used to teach foreign, languages to native students, or to teach English to foreign students.

The subject matter which I regard as my invention is particularly pointed out and distinctly claimed in the concluding portion of this specification. The invention, however, both as to organization and method of operation, together with further objects and advantages thus may best be understood by reference to the accompanying drawings wherein like reference numerals refer to like elements and in which:

Figure 1:
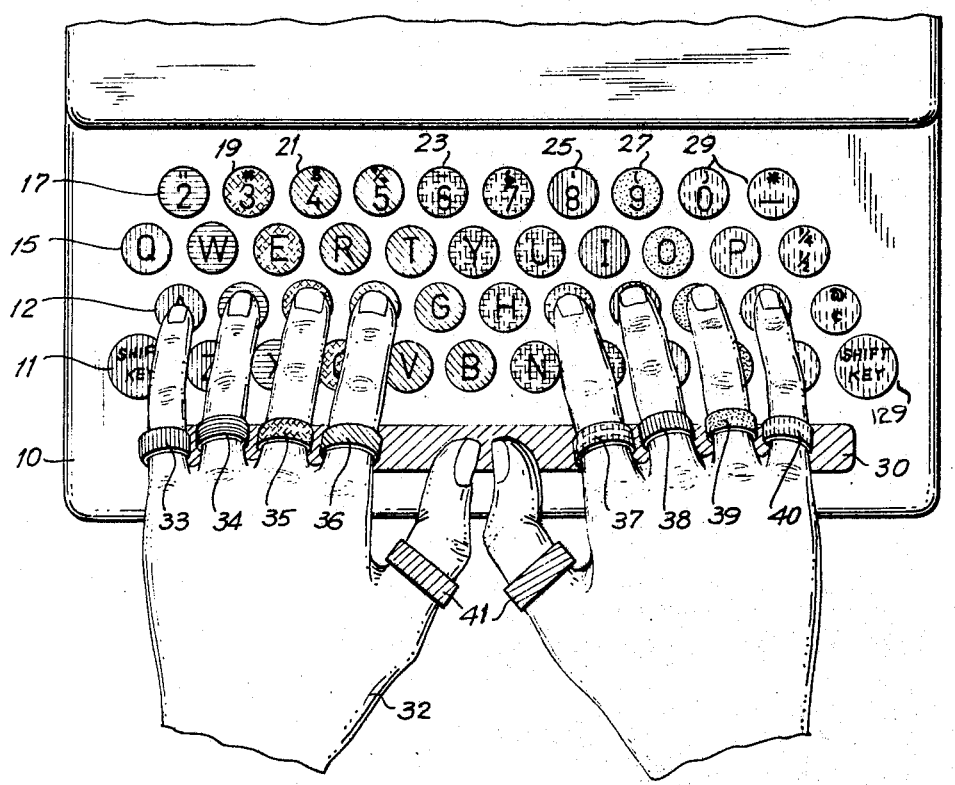
FIG. 1 is a plan view, partly broken away, illustrating the device of the present invention and its manner of use by a student.
Figure 2:
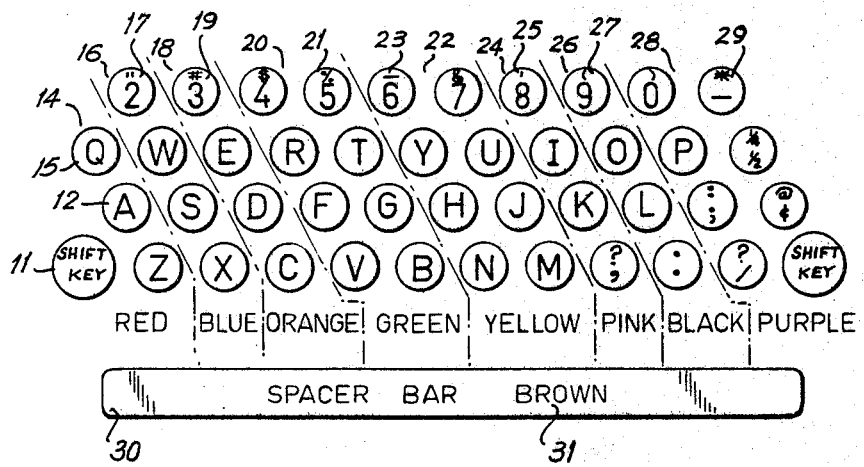
FIG. 2 is a schematic view of a typical typewriter key board illustrating the division of a key board into separate sectors.

Referring first to FIGS. 1 and 2, a preferred embodiment of the present iunvention as well as the method by which it is used, is shown. A conventional typewriter 10 has a conventional key board 12, the keys of which arranged in a well known manner. It will be understood that the device and method of this invention can be utilized with any key board arrangement on a typewriter, as well as to any instrument such as a computer input device, teletype machine and the like. However, for the purposes of description the invention will be described in relation to its use with a conventional typewriter.

Referring now particularly to the key board diagram of FIG. 2, there is shown the key board 12 divided into eight sectors 14, 16, 18, 20, 22, 24, 26 and 28. Sector 14 comprises the keys which activate the letters Q, A, Z and the left hand shift key 11. Sector 16 comprises the keys corresponding to the letters X, S, W and the numeral 2. Sector 18 comprises the keys corresponding to the letters C, D, E and the numeral 3. Sector 20 comprises the keys corresponding to the letters V, B, F, G, R, T and the numerals 4 and 5. Sector 22 comprises the keys corresponding to the letters N, M, H, J, U, Y and the numerals 6 and 7. Sector 24 comprises the keys corresponding to the letters K and I as well as the comma (,) and the numeral 8. Sector 26 comprises the keys corresponding to the letters L and O, the period and the numeral 9, while sector 28 comprises the semicolon, the slash, the cent symbol, the fraction ½, the numeral 0, the dash and the right hand shift key 29. A space bar 30 is provided to move the carriage one space, as when spacing between letters is required. In accordance with one basic feature of this invention, colored discs are applied to all keys on the key board 12, each of the discs which are applied to individual sectors being of a distinguishable and different color. In one embodiment of this invention, all the keys in sector 14 are covered with a red disc 15; those of sector 16 with a blue disc 17; and those of sector 18 with an orange disc 19. Each key of sector 20 is covered with a green disc 21 while the keys of sector 22 are each covered with a yellow disc 23. In sector 24, the keys are all covered with pink discs 25; in sector 26 the keys are all covered with black discs 27 and in sector 28 the keys are all covered with discs 29 of a purple color. The space bar 30 is covered with a brown marking 31 which is secured to the space bar in any conventional manner such as by use of an adhesive.

It will be obvious that the group of colors described herein, is merely for the purpose of illustrating one possible embodiment of this invention, and that any combination of disc colors can be used with equivalent results.

It is also within the scope of this invention that the typewriter be prepared or manufactured with the keys already colored in the manner described instead of the discs being applied to the keys at a subsequent time. The colored discs may be made of plastic, or other suitable material, and are provided with an adhesive coating on the underside thereof, so that they may be readily secured to the keys.

In a preferred embodiment of this invention the colored discs are opaque, but it is also within the scope of this invention that the colored discs be made of a translucent material so as to permit the symbol indication on the key to be visible through the disc. In another possible version of this invention, the colored discs are made of an opaque material having the symbol of the key printed thereon to further aid the student in the location of the desired key. It will be appreciated that any combination of the above described forms of the colored discs may be used interchangeably as the student acquires greater levels of ability in the use of the typewriter.

Referring now to FIG. 1, the hands 32 of the student are shown in position for preparation of a typing sequence. As shown, the student's hands are in the so-called "rest" position, the four fingers, other than the thumb of the left hand, resting on the A, S, D, and F keys while on the right hand, excluding the thumb once again, the fingers rest on the J, K, L, and semicolon keys. The thumbs rest on the space bar 30.

As shown in FIG. 1, colored rings 33, 34, 35, 36, 37, 38, 39 and 40 are placed on the fingers of the two hands, while a set of colored rings 41 is placed on the thumbs of the student. Each of the rings 33–40 is of a separate and distinguishable color, each color of the rings corresponding to the color of the discs covering the keys in that sector of the keyboard in which the finger upon which the ring is placed is to be utilized to strike the desired key. That is, the pinky of the left hand, which is used to strike the keys in sector 14, has a ring 33 thereon which is red in color corresponding to the red color of the discs 15 in sector 14. Likewise, the ring finger on the left hand, on which ring 34 is placed, strikes all the keys in sector 16 on which the discs 17 are blue, ring 34 also being blue in color. In a similar manner, ring 35 is made of an orange material, ring 36 of a green material, ring 37 of a yellow material, ring 38 of a pink material, ring 39 of a black material and ring 40 of a purple material corresponding to the color of discs 19, 21, 23, 25, 27 and 29 respectively. Rings 41 which are placed around the thumb are made brown corresponding to the color of marking 31 placed on the space bar 30.

Rings 33 through 41 may be made of any suitable material but are preferably made of a colored plastic which may be readily placed on the fingers in a manner of a conventional ring. They could also be made of any cloth-like material or any other flexible material which may be placed on the fingers of the student. Ring 41 has a greater diameter than the other rings as they are to be placed on the student's thumbs. The colored rings may also be made of a severed loop which can be pulled apart at the line of severance and then placed over the fingers and released to firmly, but removably place the colored rings on the student's fingers.

Figure 3:
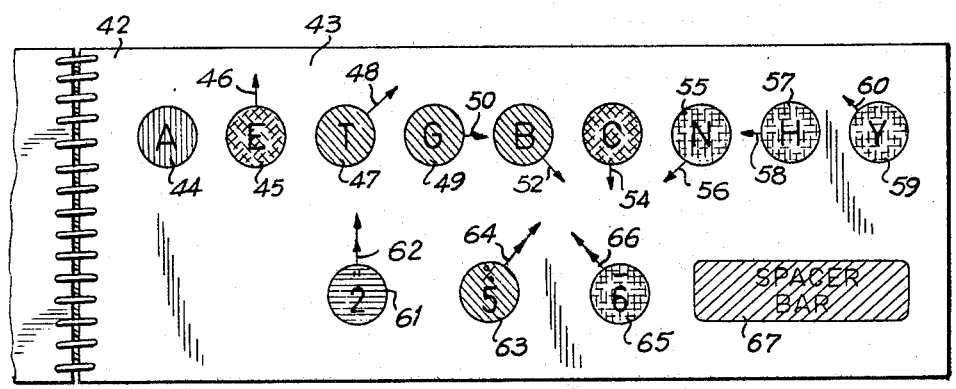
FIG. 3 is a typical page from an instruction manual illustrating the manner in which directions are indicated to the student.

The manner of operation of the present invention will now be described with reference to FIGS. 3 and 4. It should now be appreciated that any key on the typewriter keyboard may be defined by a color indication as well as a direction indication. That is, to instruct the student to hit any desired key, the instruction must indicate a color which will tell the student which finger is to be moved, and a directional indication telling the student the direction in which that finger must be moved to strike the desired key.

More specific examples of the instruction method is illustrated on a typical page 43 from an instruction manual 42. Circle 44 is red in color, and is meant to instruct the student as to the location of the key carrying the letter A. The student then knows that he is to use the finger carrying the red ring 33, that is the little finger of the left hand. As there is no arrow or directional signal associated with circle 44, the student is instructed to strike the key upon which this finger is resting in its "rest" position, that is, the key carrying the letter A. Circle 45 is orange in color so that the student then knows that he must type with the finger carrying orange ring 35, or the third finger on the left hand. The arrow 46 extending upwards from circle 45 indicates the direction this finger is to move from its rest position. The arrow 46 having only one arrow head thereon, indicates that the finger is to be moved one space diagonally upwards from its rest position to strike the E key. Circle 47 is green in color and has an arrow 48 extending diagonally upward and indicates that the finger carrying the green ring 36 is to be moved one position diagonally upwards from its rest position to strike the T key. Similarly, circle 49, which is yellow in color, has an arrow 50 extending horizontally and to the right thereof, indicating that the index finger on which the green ring 36 is worn, will be moved one space to the right to strike the G key. Referring to the other examples given in FIG. 3, green circle 51 has arrow 52 extending diagonally downward therefrom which would tell the student to move his left hand index finger diagonally downward to strike the B key. Orange circle 53, having arrow 54 extending vertically downward, indicates to the student that he must use the finger carrying the orange ring 35 one space downward to strike the C key. Similar instructions are derived from yellow circle 55 and arrow 56 which denote that the student is to move the finger carrying the yellow ring 37 to strike the N key. Yellow circle 57 and leftward extending arrow 58 indicate that the index finger on the right hand carrying the yellow ring 37 is to move one space horizontally to strike the H key. Furthermore, yellow circle 59 has an arrow 60 extending upward and to the left to indicate that the right hand index finger must go upward to strike the Y key. Circle 61, which is blue in color, has a two-headed arrow 62 extending vertically upward to indicate that the finger carrying blue ring 34, the ring finger on the left hand, is to move two spaces upward to strike the numeral 2 key. Similarly green circle 53 has a two-headed arrow 54 extending diagonally to the right, indicating that the index finger on the left hand carrying green ring 36 is to move two spaces diagonally upwards to strike the numeral 5 key, and the yellow circle 65, carrying two-headed arrow 66 extending diagonally upward to the left, indicates that the right hand index finger carrying yellow ring 37 is to move two spaces upwards to strike the numeral 6 key. A space bar indication, given by a brown rectangle 67, indicates that either thumb carrying the brown ring 41 is to be utilized to depress the space bar. In this manner, it will be appreciated that by merely giving a color and arrow indication, the student is taught which finger to use and which direction the finger is to be moved to strike the desired key on the keyboard 12. In this manner, the student can learn the location of keys on the keyboard without the need of looking at the keyboard. Thus, the student can readily learn to touch type.

Figure 4:
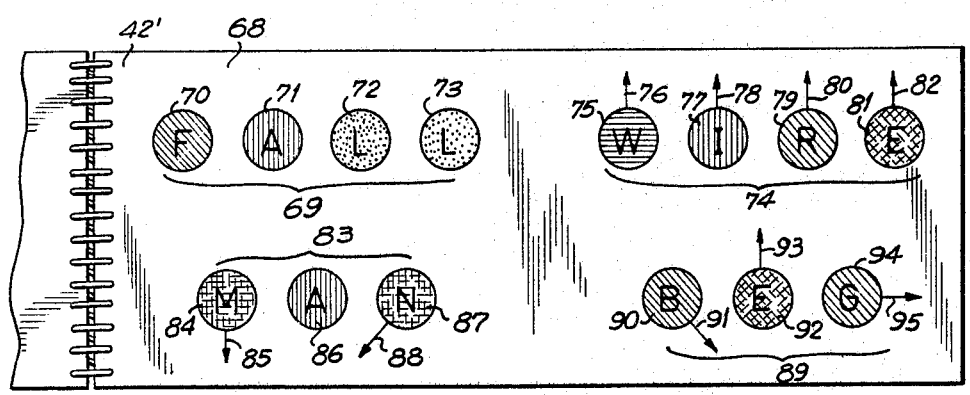
FIG. 4 is a sample page from an instruction manual illustrating one method by which complete words can be taught to the student.

Another page 68 of manual 42 is shown in FIG. 4 to illustrate how this invention can be used to expand the touch typing instruction into a means for teaching spelling and word formation. For example, a word 69 is shown formed of four circles corresponding to its component letters. These are a green circle 70, a red circle 71, and black circles 71 and 72, none of which have an arrow direction indicator associated therewith. The student in response to the information given by the colored circles will use the index finger of the left hand bearing the green ring 36, followed by the little finger on the left hand bearing the red ring 33, and two successive operations of the ring finger on the right hand bearing the black ring 39. As there are no arrows extending from these circles each finger is used in its rest position to produce the word "fall." In a similar manner, a word 74 is formed from the four circles 75, 77, 79 and 81 each of which have arrow heads 76, 78, 80 and 82 respectively associated therewith. Circle 75 is blue in color, circle 77 is pink in color, circle 79 is green in color and circle 81 is orange in color, so that together with the directions of the arrow associated with these circles, the word "wire" may be formed when the student follows the color-arrow indications. Similarly, a word 83 "man" may be typed by following the color-arrow directions of yellow circle 84 having arrow 85, red circle 86 having no arrow, and a yellow circle 87 having arrow 88, and word 89 "beg" is formed by typing the keys indicated by a green circle 90 having arrow 91, an orange circle 92 having arrow 93 extending therefrom and a green circle 94 having arrow 95 associated therewith.

In this manner, the student will form complete words and sentences by the color and arrow directions without being able to read or understanding the meaning of the words, while at the same time he is learning the location of the symbols on the keyboard. In the first phase of instruction, the student will follow the color and arrow indication in his manual and then will see which letter he has typed. He will then associate a color and arrow indication with a particular letter or symbol on the keyboard. This can be repeated until the student is completely familiar with this method of operation. When the student has mastered this first phase of the instruction, the instruction will then merely indicate a colored circle having a letter therein. At this stage of his development, the color of the circle tells the student which finger he should use, but at this time he will know which direction that finger will move to strike the desired symbol printed within the colored circle. In the third step of instruction, the colored circle is omitted and only the letter or character is printed in its key color. The fourth step in this instructional procedure will be the normal method of merely indicating a letter, with no specific color or arrow indication being given. The student will at this stage be fully able to strike the proper key without further assistance from the device and method of this invention.

In another aspect of this invention, the typing instruction method described above can be used to instruct the student to develop his language and verbal skills. In this method, a picture of any recognizable object, such as an animal, an article of clothing or any household implement can be shown. Near the object there will be shown a colored circle and arrow, each of which correspond to letters spelling out the word describing the object shown. No actual letters will be shown.

Thus, if a cat is shown in the picture, the colored circle and arrow, corresponding to the keys bearing the letters, "c," "a," and "t" will be shown without these letters themselves being shown. The student would then move the fingers carrying the appropriate colored rings from the rest position in the direction indicated by the arrow to type the letters "c," "a," and "t." The student will then begin to associate the letters "c," "a," "t" with the object shown namely the cat. By doing this a sufficient number of times with many different objects, the student will eventually develop an ability to read and write and he will learn complete words which he can readily associate with known objects. Thus, while he is learning touch typing by learning the position of the symbols on the typewriter key board, he is also learning vocabulary, spelling and reading skills without any resort to verbal instruction and without previous reading and spelling training. Therefore, a child having no previous verbal skills can essentially teach himself important language skills by use of the invented method and device described herein. It is apparent that by this self teaching method, the student's motivation and interest will be heightened and his learning process will be accordingly more effective.

While I have shown and described several embodiments of my invention, it will be apparent to those skilled in the art that many changes and modifications may be made without departing from my invention in its broader aspects, and I, therefore, intend the appended claims to cover all such changes and modifications as fall within the true spirit and scope of my invention.

What is claimed is:

1. A method for teaching a student skills with a typewriter comprising the steps of:
    (a) color coding predetermined sectors of the typewriter keyboard by placing colored discs on the keys within each of said sectors,
    (b) placing a plurality of colored rings on the fingers of the student, the colors of said indicators corresponding to the colors used on said sectors, and
    (c) instructing the student from a booklet to strike preselected keys by providing the student with colored areas associated with the colored discs in varying arrangement on the pages of said booklet including arrows drawn from selected color areas in said booklet to indicate the proper movement of the index fingers within each of said sectors.

2. An educational device for teaching language skills to a student using a typewriter, comprising;
    a plurality of groups of colored discs for attachment to the keys of each sector of the typewriter, each group having the same color for attachment to the keys operated by the same index finger, a plurality of colored finger rings corresponding in color to said groups for engaging each index finger of the student corresponding in placement to the disc color group on the keyboard of the typewriter, a color indicator for attachment to the space bar of the typewriter, additional color rings having the same color as said indicator for engaging the thumbs of the student, and an instruction booklet for teaching the language skills in cooperation with the typewriter, said booklet having colored areas associated with said indicia in varying arrangement on the pages of said booklet including arrows drawn from selected color areas in said booklet to indicate the proper movement of the index fingers within said color groups.

3. The educational device as recited in claim 2 wherein said color discs are opaque.

4. The educational device as recited in claim 2 wherein said color discs are translucent permitting the indicia of said keys to be visible to the student.

References Cited

UNITED STATES PATENTS

| 662,834 | 11/1900 | Tcherkassov | 35—5 |
| 1,277,645 | 9/1918 | Rothkugel | 35—29.3 |
| 904,325 | 11/1908 | Heffernan | 84—451 |
| 2,807,183 | 9/1957 | Ney | 84—471 |

FOREIGN PATENTS

| 839,122 | 5/1922 | Germany. |
| 365,928 | 1/1932 | Great Britain. |
| 410,482 | 10/1966 | Switzerland. |
| 799,430 | 8/1958 | Great Britain. |
| 931,038 | 7/1963 | Great Britain. |

EUGENE R. CAPOZIO, Primary Examiner

W. W. NIELSEN, Assistant Examiner